US006577468B2

(12) United States Patent
Daniel et al.

(10) Patent No.: US 6,577,468 B2
(45) Date of Patent: Jun. 10, 2003

(54) TUBULAR GASKET FOR A DISC DRIVE

(75) Inventors: Mathew Daniel, Oklahoma City, OK (US); John D. Stricklin, Oklahoma City, OK (US)

(73) Assignee: Seagate Technology LLC, Scotts Valley, CA (US)

(*) Notice: Subject to any disclaimer, the term of this patent is extended or adjusted under 35 U.S.C. 154(b) by 45 days.

(21) Appl. No.: 09/905,382

(22) Filed: Jul. 13, 2001

(65) Prior Publication Data

US 2002/0135932 A1 Sep. 26, 2002

Related U.S. Application Data

(60) Provisional application No. 60/277,781, filed on Mar. 21, 2001.

(51) Int. Cl.[7] .............................................. G11B 17/02
(52) U.S. Cl. .................................................. 360/97.02
(58) Field of Search ........................ 360/97.02, 97.03, 360/97.04, 97.01

(56) References Cited

U.S. PATENT DOCUMENTS

| 4,896,231 A | | 1/1990 | Hoppe |
| 5,150,267 A | | 9/1992 | Reinisch |
| 5,282,101 A | | 1/1994 | Reinisch |
| 5,293,282 A | * | 3/1994 | Squires et al. ........... 360/97.03 |
| 5,326,611 A | | 7/1994 | Kishita et al. |
| 5,422,766 A | | 6/1995 | Hack et al. |
| 5,703,734 A | | 12/1997 | Berberich et al. |
| 5,793,566 A | | 8/1998 | Scura et al. |
| 5,796,557 A | * | 8/1998 | Bagnell et al. .......... 360/97.03 |
| 5,956,213 A | | 9/1999 | Dague et al. |
| 6,392,838 B1 | * | 5/2002 | Hearn et al. ............. 360/97.02 |

* cited by examiner

Primary Examiner—Robert S. Tupper
(74) Attorney, Agent, or Firm—Fellers, Snider, et al.,

(57) ABSTRACT

A disc drive has a head disc assembly that includes a basedeck with a threaded attachment aperture supporting a rotatable disc surface for storage of data and a rotary positionable read/write head adjacent the rotatable disc surface for writing data to and reading data from the rotating disc surface, a top cover with a mating aperture aligned to the threaded attachment aperture communicating with the basedeck to form an enclosure, a gasket constraint formed in the basedeck with an overlapping portion forming a gasket junction while supporting a tubular gasket sandwiched between the top cover and the basedeck. The tubular gasket has a first end adjacent the overlapping portion and a second end adjacent the overlapping portion; the second end communicates with a main body portion of the tubular gasket to seal the enclosure upon securing the top cover to the basedeck with a top cover fastener.

14 Claims, 4 Drawing Sheets

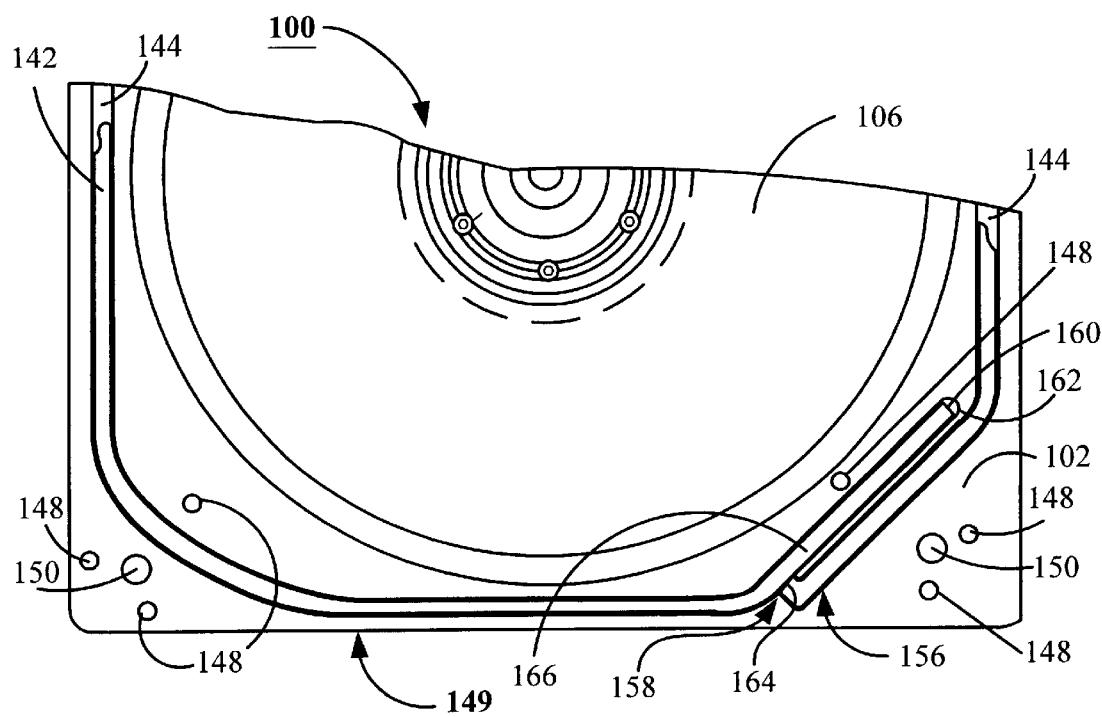
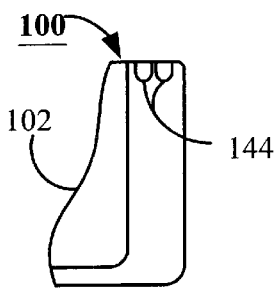
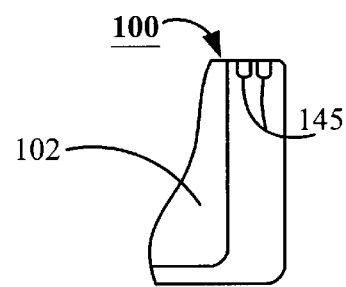
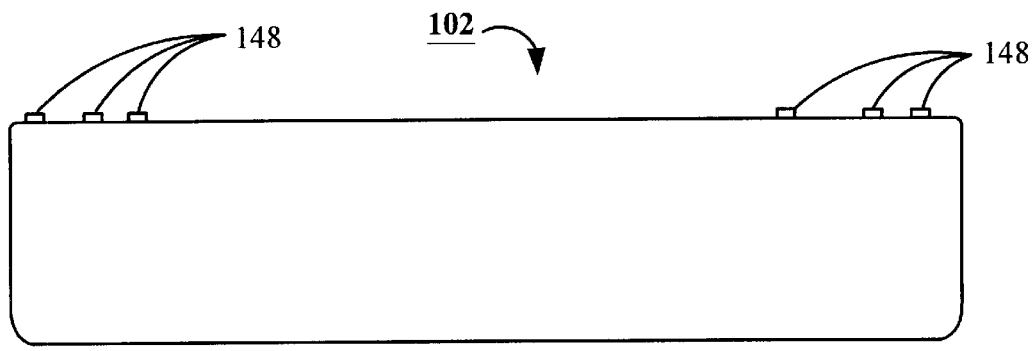

TUBULAR GASKET FOR A DISC DRIVE

RELATED APPLICATIONS

This application claims priority to U.S. Provisional Application No. 60/277,781 filed Mar. 21, 2001, entitled Tubular Gasket For A Disc Drive.

FIELD OF THE INVENTION

This invention relates generally to the field of data storage devices, and more particularly, but not by way of limitation, to incorporation of a tubular gasket in a disc drive.

BACKGROUND

Disc drives are used for data storage in modem electronic products ranging from digital cameras to computers and network systems. Typically, a disc drive includes a mechanical portion, or head disc assembly (HDA), and electronics in the form of a printed circuit board assembly (PCB), mounted to an outer surface of the HDA. The PCB controls HDA functions and provides a communication interface between the disc drive and a host being serviced by the disc drive.

Typically, an HDA includes a magnetic disc surface affixed to a spindle motor assembly for rotation at a constant speed and an actuator assembly positionably controlled by a closed loop servo system. The actuator assembly supports a read/write head that traverses generally concentric magnetic tracks radially spaced across the disc surfaces for writing data to and reading data from the magnetic tracks.

Continued demand for disc drives with ever-increasing performance capabilities insists manufacturers seek ways to increase the storage capacity, data throughput and to improve overall operating efficiencies. Present generation disc drives typically achieve bit densities of multiple gigabits per square centimeter, $Gbits/cm^2$. Increasing bit densities can be achieved by increasing the number of bits stored along each track, or bits per inch (BPI), generally requiring improvements in the read/write channel electronics, and/or by increasing the number of tracks per unit width, or tracks per inch (TPI), generally requiring improvements in servo control systems. As bit density increases it is not uncommon for fly heights to decrease, which heighten the need to control environmental conditions internal to the disc drive.

One approach taken by disc drive manufacturers to improve control of the internal environment has been the inclusion of pre-formed gasket material sandwiched between housing components, which precludes passage of external environmental conditions into the disc drive. For example, U.S. Pat. No. 4,896,231 issued to Hoppe exemplifies one such construction of a pre-formed gasket recently proposed in the art, sealing the inner workings of the disc drive from its external environment. The Hoppe solution includes a central stiffener member sandwiched between a pair of foam layers. Typically, pre-formed gaskets, either single or multi layered, are punched from sheets of gasket material that produce highly functional gaskets but also large volumes of waste material. Additionally, multiple product lines normally means multiple configurations of gaskets to be purchased, transported, received and inspected then stocked and issued to production. These material management costs can easily overshadow the cost of the gasket itself.

An alternate approach is exemplified by U.S. Pat. No. 5,326,611 issued to Kishita et al, which proposes the use of a fluorosilicone rubber composition injected on a surface of one of either housing components of the disc drive. Other known approaches incorporate the use of formed-in-place silicone rubber gaskets. However, a characteristic common to both materials is their propensity to out-gas volatiles that remain within the material subsequent to the cure process. Out-gassing, even at a significantly reduced rate, directly impacts head-disc interface, deteriorating fly height and is known to lead to stiction and has led to head crashes. Additionally, the cure process the formed-in-place gasket subjects the housing component to elevated temperatures that can warp the housing component, causing the housing component to be scraped.

As such, challenges remain and a need persists for improved materials and techniques for providing gaskets that are cost effective and maintain the internal environment of a disc drive.

SUMMARY OF THE INVENTION

Embodiments of the present invention provide a head disc assembly comprising having a basedeck with a threaded attachment aperture supporting a rotatable disc surface for storage and retrieval of data and a rotary positionable read/write head adjacent the rotatable disc surface for writing data to and reading data from the rotating disc surface, the basedeck communicating with a top cover that includes a mating aperture aligned to the threaded attachment aperture to form an enclosure while providing a gasket groove with an overlapping portion forming a gasket junction adjacent the top cover.

The gasket groove supports a tubular gasket that has a first end, a second end and a main body portion. The tubular gasket is nestled into the gasket groove and sandwiched between the top cover and the basedeck. The first end of the tubular gasket is adjacent the overlapping portion of the gasket groove and the second end of the tubular gasket is likewise adjacent the overlapping portion. However, the second end turns to communicate with the main body portion to seal the enclosure when the top cover is secured to the basedeck with a top cover fastener by passing the top cover fastener passing through the mating aperture into threading engagement with the threaded attachment aperture, then applying a torque at a predetermined level, a sealed environment within the enclosure is formed.

These and various other features and advantages, which characterize embodiments of the present invention, will be apparent from the reading of the following detailed description and review of the associated drawings.

BRIEF DESCRIPTION OF THE DRAWINGS

FIG. 2 is a partial plan view of a head-disc assembly with an overlapping gasket groove providing a gasket junction of the disc drive of FIG. 1.

FIG. 3 shows a partial cut-away, cross section elevational view of a basedeck with a substantially curved gasket groove of the overlapping gasket groove of FIG. 2.

FIG. 4 shows a partial cut-away, cross section elevational view of a basedeck with a substantially rectangular cross sectional gasket groove of the overlapping gasket groove of FIG. 2.

FIG. 5 is an elevational view of the top cover of the disc drive of FIG. 1.

FIG. 6 is an elevational view of the basedeck of the disc drive of FIG. 1.

DETAILED DESCRIPTION

Figure 1:
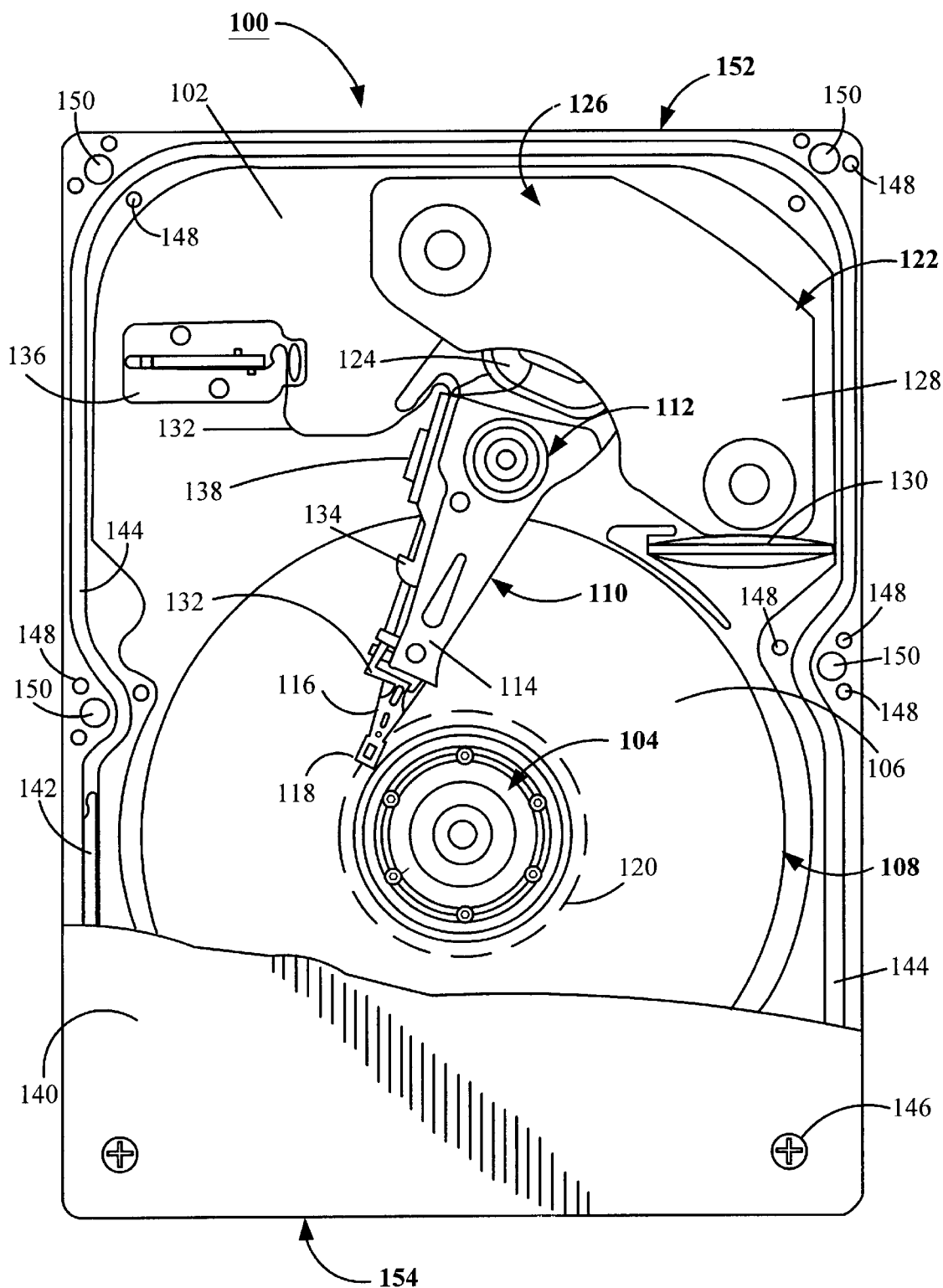
FIG. 1 is a top plan view of a disc drive incorporating a tubular gasket for sealing an enclosure of the disc drive in accordance with an embodiment of the present invention.

Referring to the drawings in general, and more particularly to FIG. 1, shown therein is a top view of a disc drive 100 constructed in accordance with an embodiment of the present invention. Numerous details of and variations for the construction of the disc drive 100 are not included in the following description, as such are well-known to those skilled in the art and are believed to be unnecessary for the purpose of describing embodiments of the present invention.

The disc drive 100 includes a basedeck 102 supporting various disc drive components, including a spindle motor assembly 104. The spindle motor assembly 104 supports at least one axially aligned rotatable disc surface 106 forming a disc stack 108 (also referred to as a "disc pack"). Adjacent the disc stack 108 is an actuator assembly 110 (also referred to as an "E-block" or a head stack assembly (HSA)), which pivots about a primary actuator motor support 112 (also referred to as a "bearing assembly") in a rotary fashion. The HSA 110 includes at least one actuator arm 114 that supports a load arm 116. Each load arm 116 in turn supports at least one positionable read/write head 118 (also referred as head (s) 118) that correspond to each disc surface 106. Each disc surface 106 is divided into concentric circular data tracks 120 (only one shown) over which the read/write heads 118 are positionably located, and on which head position control information are written to embedded servo sectors (not separately shown). The embedded servo sectors separate a plurality of data sectors (not separately shown) for use by customers to store data.

The HSA 110 is controllably positioned by a primary actuator motor 122 (also referred to as a "voice coil motor assembly" (VCM)), comprising an actuator coil 124 immersed in the magnetic field generated by a magnet assembly 126. A magnetically permeable flux path provided by a steel plate 128 (also called a top pole piece) is mounted above the actuator coil 124 to complete the magnetic circuit of the VCM 122. During operation of the disc drive 100, current is passed through the actuator coil 124 and an electromagnetic field is setup, which interacts with the magnetic circuit of the VCM 122 to cause the actuator coil 124 to move relative to the magnet assembly 126 in accordance with the well-known Lorentz relationship. As the actuator coil 124 moves, the HSA 110 pivots about the bearing assembly 112 (also referred to as a primary actuator motor support), causing the heads 118 to move over the surfaces of the discs 106, thereby positioning of the heads 118 adjacent a selected data track 120 of the disc surfaces 106.

During operations of the disc drive 100, an air filter 130 continually cleans the internal environment of the disc drive 100 by removing debris generated through the operation of the disc drive 100. Removal of particles generated through typical operations of the disc drive 100 advances the ability of the disc drive 100 to operate reliably by reducing the chances of premature failure resulting from a head crash propagated by airborne particulate contaminants.

To provide the requisite electrical conduction paths between the read/write heads 118 and disc drive read/write circuitry (not shown), read/write head conductors (not separately shown) are affixed to a read/write flex circuit 132. The read/write flex circuit 132 is routed from the load arms 116 along the actuator arms 114 and into a flex circuit containment channel 134, then on to a flex connector body 136. The flex connector body 136 supports the read/write flex circuit 132 during passage of the read/write flex circuit 132 through the basedeck 102 and into electrical communication with a disc drive printed circuit board assembly (PCB) (not shown) mounted to the underside of the basedeck 102. The read/write flex circuit 132 also supports read/write signal circuitry, including preamplifier/driver (preamp) 138 used to condition read/write signals passed between the read/write circuitry (not shown) and the read/write heads 118. The PCB of the disc drive supports read/write circuitry, which controls the operation of the heads 118, as well as other interface and control circuitry for the disc drive 100.

A top cover 140 compresses a tubular gasket 142 (partially removed) contained by a gasket groove (also referred to as a gasket constraint) 144 formed in the basedeck 102 as a result of securing top cover fasteners 146 through the top cover 140 and into the basedeck 102. The top cover 140 bottoms out against a plurality of pads 148 that control an amount of compressive force imparted of the tubular gasket 142 during the top cover attachment process. The gasket constraint 144 may be formed by machining it into the basedeck 102, casting into the basedeck 102, or affixed to a top surface (not shown separately) of the basedeck 102. The gasket groove 144 may be recessed into the top surface of the basedeck 102, or it may project out, either totally or partially, of the top surface of the basedeck 102. It is also noted that the gasket groove 144 may be formed as a portion of the top cover while remaining in full compliance with the spirit and scope of the present invention.

In a first embodiment, the top cover fasteners 146 cooperate with respective threaded attachment apertures 150 to impart the compressive force on the tubular gasket 142 as a result of applying substantially 6 in. lbs. of torque on each of six 4–40 by 0.48 cm. screws. The attached top cover 140 in combination with the tubular gasket 142 along with the disc pack 108 and the HSA 110 secured to the basedeck 102 forms a head-disc-assembly 152. The top cover 140, the tubular gasket 142 and the basedeck 102 forms an enclosure 154 portion of the head-disc-assembly 152, which provides a sealed environment within the enclosure 154 upon securing the top cover 140 to the basedeck 102 with the top cover fasteners 146.

FIG. 2 shows an overlap portion 156 of the gasket groove 144 providing a gasket junction 158. In a gasket installation process a first end 160, of the tubular gasket 142 is placed adjacent a first end 162 of the gasket groove 144, then the remaining portion of the tubular gasket 142 is fed adjacent to and nestled into the gasket groove 144. At the conclusion of the gasket installation process a second end of the gasket 164 is positioned in matting contact with a main body portion 166 of the gasket 144.

In the first embodiment, a fluorel tube with an outer diameter (OD) of substantially 0.0625 in. (0.16 cm.) and an inner diameter (ID) of substantially 0.031 in. (0.079 cm.) is dispensed from a reel and nestled into the gasket groove 144. The gasket groove 144 is cast into the basedeck 102 forming a rounded groove of 0.0550 in (0.14 cm.) width by 0.0375 in. (0.095 cm.) depth, as shown by FIG. 3.

Returning to FIG. 2. After the tubular gasket 142 has been inserted into the gasket groove 144, the cover 140 (of FIG.

1) is placed on the basedeck 102 and six 4–40 by 0.1875 in. (0.45 cm) long top cover fasteners 146 (of FIG. 1) are placed in respective basedeck mating apertures (not separately shown) in the cover. The top cover fasteners 146 (of FIG. 1) are torqued to 6 in-lb through interaction with the corresponding threaded attachment apertures 150 of the basedeck 102. The cover bottoms out on the pads 148 provided on the base deck 102. The height of the pads 148, determine the amount of compression imparted on the tubular gasket 142. Generally, the amount of compression of the tubular gasket 142 is between approximately 20–30% of its diameter.

The compression squeezes the tube thus sealing the drive. A demonstration HDA 148 (of FIG. 1), with the six 4–40 by 0.1875 in. (0.45 cm) long top cover fasteners 146 (of FIG. 1) tightened to 6 in-lb., was assembled in accordance with the teachings of the present invention and leak rate tested. The HDA 148 (of FIG. 1) performed at a leak rate of 4.2 cc/min at one inch of water, which is within the specification limit of 12 cc/min at 1 inch of water.

FIG. 4 shows an alternate embodiment in which the gasket constraint 145 is supported by the basedeck 102 and forms a substantially rectangular cross sectional groove of 0.0550 in (0.14 cm.) width by 0.0375 in. (0.095 cm.) depth.

FIG. 5 shows a pair of protrusions 168 created in the top cover 140 that press across the main body 166 (of FIG. 2) adjacent the first end 162 (of FIG. 2) and the second end 164 (of FIG. 2) of the tubular gasket 142 (of FIG. 2). Each protrusion 168 provides a higher localized compression rate of the main body 166 (of FIG. 2) of the tubular gasket 142 (of FIG. 2) adjacent each of the respective ends 162 and 164 (both of FIG. 2), which enables the inner diameters of the main body 166 (of FIG. 2) of the tubular gasket 142 (of FIG. 2) adjacent each of the respective ends 162 and 164 (both of FIG. 2) to press against each other internally thus providing a sealed environment within the enclosure 154 (of FIG. 1) upon securing the top cover 140 (of FIG. 1) to the basedeck 102 (of FIG. 1) with the top cover fasteners 146 (of FIG. 1) I bottoming out the top cover 140 (of FIG. 1) against the pads 148 (of FIG. 6).

Figure 7:
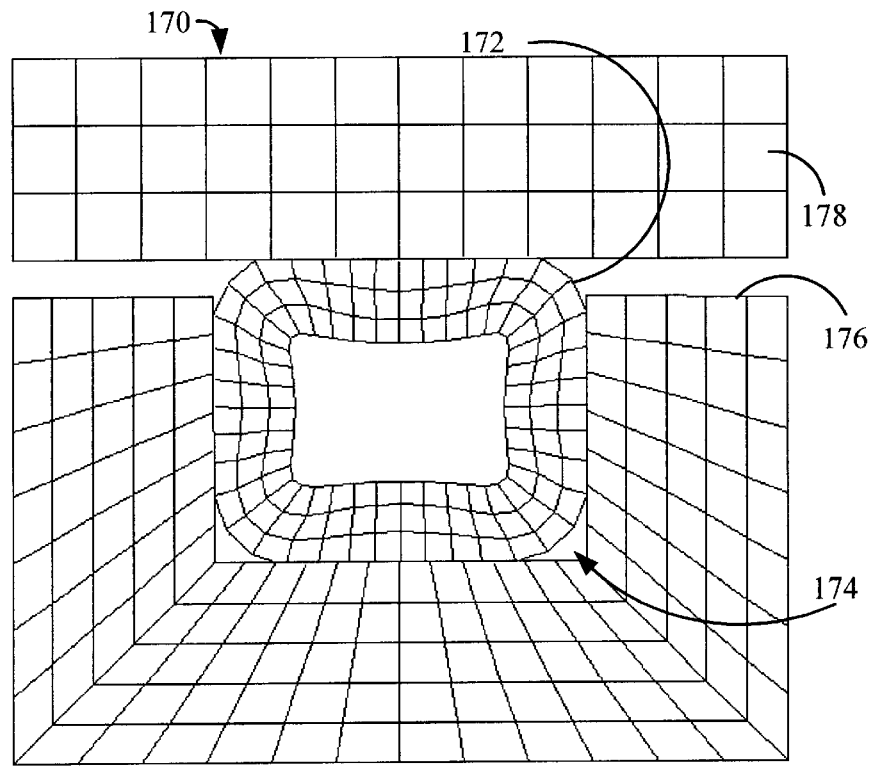
FIG. 7 is a displacement plot of a simulated tubular gasket within the gasket groove and under a compressive load for a simulated disc drive of the disc drive of FIG. 1.

FIG. 7 shows displacement plot 170 of a simulated tubular gasket 172 (simulating tubular gasket 142 of FIG. 1), confined by a simulated gasket groove 174 (simulating gasket groove 144 of FIG. 1) of a simulated basedeck 176 (simulating basedeck 102 of FIG. 1) under a compressive load supplied by a simulated top cover 178 (simulating top cover 140 of FIG. 1) bottoms out against the simulated basedeck 176 using 6 simulated attachment screws (not shown), each torqued to 6 in. lbs. (0.53 nt. cm.) of force. Note that the deformation is uniform and centered about a center point of the simulating gasket 172, with no portion of the simulated gasket 172 protruding beyond the sidewall confines of the simulated gasket groove 174. Under a compression of between 20% and 30% of the diameter of the simulated gasket 172, a uniform seal is achieved against each surface of the simulating gasket groove 174 as well as along the surface of the simulated top cover 178. As in a non-simulated environment, torqueing each of the six screws to 6 in. lbs. of force provides sufficient force to compress the simulated gasket 172 while detouring each of the six screws from backing out during normal drive operations, without placing undue strain on the threads of respective attachment holds (not shown) of the simulated basedeck 176.

Figure 8:
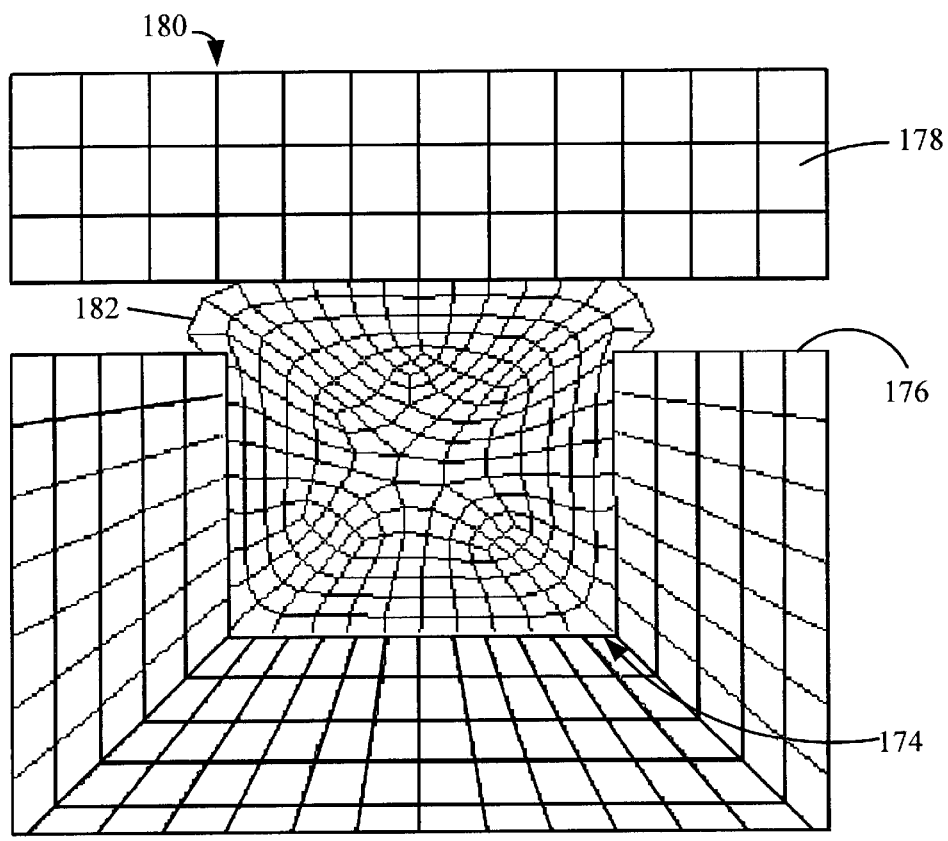
FIG. 8 is a displacement plot of a simulated O-ring gasket within the gasket groove and under a compressive load for a simulated disc drive of the disc drive of FIG. 1.

FIG. 8 shows displacement plot 180 of a simulated O-ring gasket 182 (simulating the diameter of the tubular gasket 142 of FIG. 1), confined by a simulated gasket groove 174 (simulating gasket groove 144 of FIG. 1) of a simulated basedeck 176 (simulating basedeck 102 of FIG. 1) under a compressive load supplied by a simulated top cover 178 (simulating top cover 140 of FIG. 1) bottoms out against the simulated basedeck 176 using 6 simulated attachment screws (not shown). Note that the deformation is non-uniform and centered away from a center point of the simulating simulated O-ring gasket 182 with portions of the simulated O-ring gasket 182 protruding beyond the sidewall confines of the simulated gasket groove 174. Under a compression of between 20% and 30% of the diameter of the simulated O-ring gasket 182, a uniform seal is achieved against each surface of the simulating gasket groove 174 as well as along the surface of the simulated top cover 178. However, torqueing each of the six screws to 36 in. lbs. of force provides sufficient force to compress the simulated O-ring gasket 182, that amount of force places the threaded attachment system under undue strain and bulges the simulated O-ring gasket 182 out of the simulated gasket groove 174, which could get pinched as the gap between the simulated top cover 178 and the simulated basedeck 176.

Figure 9:
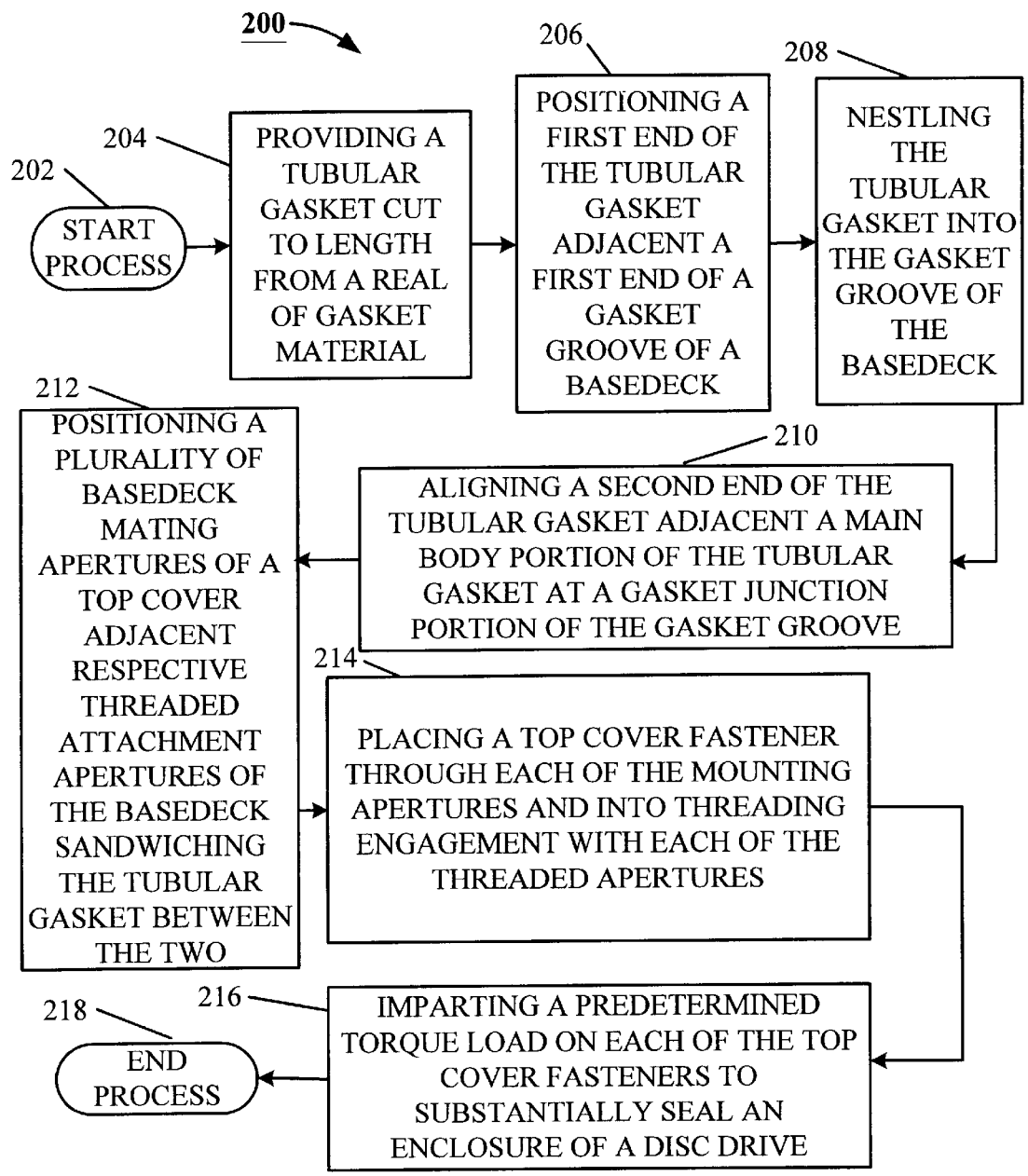
FIG. 9 is a flow diagram showing steps for applying the tubular gasket to the enclosure of the disc drive of FIG. 2.

FIG. 9 shows a block diagram of a tubular gasket installation process 200 used in applying a tubular gasket (such as 142) to a basedeck (such as 102) to form an environmentally sealed enclosure (such as 154) of an HDA (such as 152) of a disc drive (such as 100). The tubular gasket installation process starts at start process step 202 and continues with step 204. At process step 204, the tubular gasket is cut to length from a reel of gasket material (not shown). The gasket material on the reel is pre-molded fluorel, which is cured at a temperature of substantially 450° F. for approximately 12 hours. Using pre-cured gasket material, avoids the need of exposing the top cover to elevated temperatures, as would be required with a formed-in-place gasket, and allows for the use of a lower torsional force to secure a top cover (such as 140) to the basedeck.

With the tubular gasket pre-cut, the tubular gasket installation process 200 continues with process step 206 where a first end (such as 160) of the tubular gasket is positioned adjacent a first end of a gasket groove (such as 162) of the basedeck. At process step 208 of the tubular gasket installation process 200, a main body (such as 166) of the tubular gasket is nestled into and secured by the gasket groove of the basedeck.

At process step 210 a second end (such as 164) is rotated at a substantially 90 degree angle, relative to the main body portion of the tubular gasket, and brought into mating contact with the main body portion of the tubular gasket. The gasket groove provides a "T" shaped gasket junction (such as 158) for the second end of the tubular gasket to abut the main body portion of the tubular gasket. By providing the "T" shaped gasket junction, a section of the main body portion of the tubular gasket is allowed to protrude slightly passed a plane defining a sidewall of the gasket groove and come into sealing a contact with the second end of the tubular gasket.

The next step is process step 212, positioning six basedeck mating apertures of the top cover relative to six respective threaded attachment apertures (such as 150) of the basedeck, sandwiching the tubular gasket between the top cover and basedeck. Then, at process step 214 a top cover fastener (such as 146) is placed through each of the six mounting apertures and into threading engagement with each of the threaded apertures. In process step 216 of the tubular gasket installation process 200, a predetermined torque is applied to each of the top cover fasteners impart a predetermined torsional force on each of the six top cover fasteners to substantially seal an enclosure (such as 154) of the disc drive. The tubular gasket installation process 200 concludes at end process step 218.

In accordance with one aspect of a preferred embodiment, a disc drive (such as 100) having a head disc assembly (such as 152) comprises a basedeck (such as 102) with a threaded attachment aperture (such as 150) supporting a rotatable disc surface (such as 106) for storage and retrieval of data and a rotary positionable read/write head (such as 118) adjacent the rotatable disc surface for writing data to and reading data from the rotating disc surface; a top cover (such as 140) with a mating aperture aligned to the threaded attachment aperture communicating with the basedeck to form an enclosure (such as 154); a gasket constraint (such as 144) formed in the basedeck with an overlapping portion (such as 156) forming a gasket junction (such as 154) adjacent the top cover; a gasket (such as 142) with a first end (such as 160), a second end (such as 164) and a main body portion (such as 166) nestled into the gasket constraint and sandwiched between the top cover and the basedeck with the first end adjacent the overlapping portion and the second end adjacent the overlapping portion while communicating with the main body portion to seal the enclosure; and a top cover fastener (such as 146) passing through the mating aperture while engaging the threaded attachment aperture securing the top cover to the basedeck to form an enclosure (such as 154) surrounding the rotating disc surface and the positionable read/write head, the top cover and the basedeck forming a sealed environment within the enclosure upon securing the top cover to the basedeck with the top cover fastener.

Although preferred embodiments have been depicted and described in detail herein, modification, additions, substitutions and the like can be made by those skilled in the relevant art without deviating from the spirit of the invention and are therefore considered to be within the scope of the invention as defined in the appended claims.

What is claimed is:

1. A disc drive having a head disc assembly comprising:
   a basedeck with a threaded attachment aperture supporting a rotatable disc surface for storage and retrieval of data and a rotary positionable read/write head adjacent the rotatable disc surface for writing data to and reading data from the rotating disc surface;
   a top cover with a mating aperture aligned to the threaded attachment aperture communicating with the basedeck to form an enclosure;
   a gasket constraint formed in the basedeck with an overlapping portion forming a gasket junction adjacent the top cover;
   a gasket with a first end, a second end and a main body portion nestled into the gasket constraint sandwiched between the top cover and the basedeck with the first end adjacent the overlapping portion and the second end adjacent the overlapping portion while communicating with the main body portion to seal the enclosure; and
   a top cover fastener passing through the mating aperture while engaging the threaded attachment aperture securing the top cover to the basedeck to form an enclosure surrounding the rotating disc surface and the positionable read/write head, the top cover and the basedeck forming a sealed environment within the enclosure upon securing the top cover to the basedeck with the top cover fastener.

2. The disc drive of claim 1 in which the gasket is a tubular gasket with a cross-sectional inner diameter and outer diameter.

3. The disc drive of claim 1 in which the basedeck includes a pad adjacent the gasket groove and communicating with the top cover to control the overall height of the enclosure when the top cover bottoms out against the pad as a result of the fastener securing the top cover the basedeck.

4. The disc drive of claim 1 in which the top cover includes a pair of protrusions aligned adjacent the gasket groove and communicating with the gasket, a first of the pair of protrusions pressing across the main body adjacent the first end and a second of the pair of protrusions pressing across the second end of the gasket, each protrusion providing a higher localized compression rate of the main body of the gasket adjacent each of the respective ends.

5. The disc drive of claim 1 in which the gasket constraint is a rounded groove.

6. The disc drive of claim 1 in which the gasket constraint has a substantially rectangular cross section.

7. The disc drive of claim 1 in which the gasket constraint is formed in the top cover, the gasket constraint having an overlapping portion forming a gasket junction adjacent the basedeck.

8. The disc drive of claim 7 in which the basedeck includes a pair of protrusions aligned adjacent the gasket groove and communicating with the gasket, a first of the pair of protrusions pressing across the main body adjacent the first end and a second of the pair of protrusions pressing across the second end of the gasket, each protrusion providing a higher localized compression rate of the main body of the gasket adjacent each of the respective ends.

9. The disc drive of claim 7 in which the gasket constraint is a rounded groove.

10. The disc drive of claim 7 in which the gasket constraint has a substantially rectangular cross section.

11. A disc drive having a head disc assembly comprising:
    a basedeck with a threaded attachment aperture supporting a rotatable disc surface for storage and retrieval of data and a rotary positionable read/write head adjacent the rotatable disc surface for writing data to and reading data from the rotating disc surface;
    a top cover with a mating aperture aligned to the threaded attachment aperture communicating with the basedeck to form an enclosure;
    a gasket groove formed in the basedeck with an overlapping portion forming a gasket junction adjacent the top cover;
    a gasket with a first end, a second end and a main body portion nestled into the gasket groove sandwiched between the top cover and the basedeck with the first end adjacent the overlapping portion and the second end adjacent the overlapping portion while communicating with the main body portion to seal the enclosure; and
    a top cover fastener passing through the mating aperture while engaging the threaded attachment aperture securing the top cover to the basedeck to form an enclosure surrounding the rotating disc surface and the positionable read/write head, the top cover and the basedeck forming a sealed environment within the enclosure by steps for sealing the enclosure of the disc drive.

12. The disc drive of claim 11 in which the gasket is a tubular gasket with a cross-sectional inner diameter and outer diameter.

13. The disc drive of claim 11 in which the basedeck includes a pad adjacent the gasket groove and communicating with the top cover to control the overall height of the enclosure when the top cover bottoms out against the pad as a result of the fastener securing the top cover to the basedeck.

14. The disc drive of claim 11 in which the top cover includes a pair of protrusions aligned adjacent the gasket groove and communicating with the gasket, a first of the pair of protrusions pressing across the main body adjacent the first end and a second of the pair of protrusions pressing across the second end of the gasket, each protrusion providing a higher localized compression rate of the main body of the gasket adjacent each of the respective ends.

* * * * *